United States Patent
Cho

(10) Patent No.: US 8,108,663 B2
(45) Date of Patent: Jan. 31, 2012

(54) MICRO CONTROLLER AND METHOD OF UPDATING THE SAME

(75) Inventor: Yong Deok Cho, Icheon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 951 days.

(21) Appl. No.: 11/958,371

(22) Filed: Dec. 17, 2007

(65) Prior Publication Data

US 2008/0229060 A1    Sep. 18, 2008

(30) Foreign Application Priority Data

Mar. 15, 2007  (KR) .................... 10-2007-0025509

(51) Int. Cl.
*G06F 12/14*    (2006.01)
(52) U.S. Cl. ................. 713/1; 713/2; 713/100; 713/300
(58) Field of Classification Search .................. 713/1, 2, 713/100, 300
See application file for complete search history.

(56) References Cited

U.S. PATENT DOCUMENTS

| | | | |
|---|---|---|---|
| 5,835,760 A | 11/1998 | Harmer | |
| 6,631,520 B1 * | 10/2003 | Theron et al. | 717/173 |
| 6,640,334 B1 * | 10/2003 | Rasmussen | 717/171 |
| 6,738,887 B2 * | 5/2004 | Colpo et al. | 711/202 |
| 2007/0055968 A1 * | 3/2007 | Rader | 717/168 |
| 2007/0288914 A1 * | 12/2007 | Brannock et al. | 717/169 |
| 2008/0307157 A1 * | 12/2008 | Jang et al. | 711/103 |

FOREIGN PATENT DOCUMENTS

| | | |
|---|---|---|
| KR | 1019990046934 | 7/1999 |
| KR | 1020030002068 A | 1/2003 |
| KR | 1020060087038 A | 8/2006 |

* cited by examiner

*Primary Examiner* — M Elamin
(74) *Attorney, Agent, or Firm* — Kilpatrick Townsend & Stockton LLP

(57) ABSTRACT

A micro controller includes a first storing circuit configured to store program data for performing a power on operation of a system, and a second storing circuit configured to temporarily store algorithm program data for operation of the system loaded from an external storing means while the system operates in response to control of the first storing circuit.

3 Claims, 4 Drawing Sheets

MICRO CONTROLLER AND METHOD OF UPDATING THE SAME

CROSS-REFERENCE TO RELATED APPLICATIONS

This application claims priority from Korean Patent Application No. 2007-25509, filed on Mar. 15, 2007, the contents of which are incorporated herein by reference in its entirety.

BACKGROUND OF THE INVENTION

The present invention relates to a micro controller. More particularly, the present invention relates to a micro controller for updating an internal algorithm which controls operation of a system and a method of updating the same.

Recently, efforts for enhancing operation characteristics of mobile devices such as a camcorder, a digital camera, a portable phone, an MP3 (MPEG-1 Layer3) player, etc. have been performed as the demand for mobile devices has increased. Specifically, since the mobile device should operate at low power for a long time, many low power consumption type mobile devices have been developed.

To reduce power consumption of the mobile device, power consumption of semiconductor chips included in the mobile device should be decreased. The mobile device has a micro controller for controlling operation of its elements.

The micro controller executes internal operation processes, e.g. arithmetic operations, Boolean operations, etc., and generates a control signal synchronized with a clock signal. The control signal controls timing of a system and operation of elements in the system.

FIG. 1 is a block diagram illustrating a common micro controller.

In FIG. 1, a micro controller 130 is connected to a command interface circuit 110 for processing a command inputted from an external device and an oscillator 120 for generation of a clock. The micro controller 130 includes a clock generating circuit 131 for receiving two clocks CLOCK1 and CLOCK2 from the oscillator 120 and for generating a clock needed for its operation, a storing circuit 132 for storing algorithm program information for command operation, a program counter 133 for performing an address count so as to execute a command of the storing circuit 132, a command decoder 134 for decoding the command stored in the storing circuit 132, a flag processing circuit 135 for processing flag information provided from the command decoder 134 and for providing the flag information to the clock generating circuit 131 so that the clock is generated, and an output controller 136 for outputting a control command provided from the storing circuit 132 or the command decoder 134 for operation of the memory device.

The micro controller 130 drives the algorithm program stored in the storing circuit 132 in response to the operation command inputted through the command interface circuit 110. The algorithm program is provided in sequence to the command decoder 134, the flag processing circuit 135 or the output controller 136 through a bus M_BUS<i-1:0> by changing the address of the storing circuit 132 through the program counter 133.

The flag processing circuit 135 controls the clock generating circuit 131 in response to the flag information provided from the command decoder 134 or the storing circuit 132 so that the clock generating circuit 131 generates the operation clock and provides the generated operation clock to the storing circuit 132.

The command decoder 134 decodes the command transmitted from the storing circuit 132, and provides the decoded command to the flag processing circuit 135 or the output controller 136.

The output controller 136 outputs control signals provided from the storing circuit 132 or the command decoder 134 to an external device.

The algorithm program for operation control of the memory device is stored in the storing circuit 132, e.g. a read only memory (ROM). However, it is difficult for the storing circuit 132 to change or upgrade the algorithm program in accordance with characteristics of the ROM.

SUMMARY OF THE INVENTION

It is a feature of the present invention to provide a micro controller for changing an algorithm program by changing a ROM in which algorithm program for controlling operation of the micro controller is stored and a method of updating the same.

A micro controller according to one example embodiment of the present invention includes a first storing circuit configured to store program data for performing a power on operation of a system; and a second storing circuit configured to temporarily store algorithm program data for operation of the system loaded from an external storing means while the system operates in response to control of the first storing circuit.

The first storing circuit is a read only memory (ROM).

The power on operation includes an operation of loading the algorithm program data stored in the external storing means and temporarily storing the algorithm program data in the second storing circuit.

The second storing circuit is a random access memory (RAM).

A method of updating a micro controller according to one example embodiment of the present invention includes storing update data in an external storing means coupled to the micro controller in response to an update command; loading the update data stored in the external storing means; temporarily storing the loaded data in a storing means of the micro controller; and driving the data stored in the storing means of the micro controller, thereby controlling operation of the micro controller.

The method further includes operating a program in a first storing means of the storing means of the micro controller; loading an operation program in the external storing means in response to the program in the first storing means; temporarily storing the loaded operation program in a second storing means of the storing means of the micro controller; and executing the operation program stored in the second storing means. The steps of operating, loading and the executing are performed when power to the micro controller is activated.

The update data stored in the external storing means are loaded by the operation program stored in the first storing means, and are temporarily stored in the second storing means.

The method further includes storing the operation program stored in the second storing means in the external storing means when operation of the micro controller is complete.

A method of updating in a micro controller according to another example embodiment of the present invention includes temporarily storing update data in a storing means of the micro controller in response to an update command; driving the data stored in the storing means, thereby controlling operation of the micro controller; and storing the update data stored in the storing means in an external storing means when operation of the micro controller is complete.

The method further includes operating a program in a first storing means of the storing means of the micro controller; loading an operation program in the external storing means in response to the program in the first storing means; temporarily storing the loaded operation program in a second storing means of the storing means of the micro controller; and executing the operation program stored in the second storing means. The steps of operating, loading and the executing are performed when power to the micro controller is activated.

The update data are temporarily stored in the second storing means.

The method further includes determining whether an updated program exists by operating the program in the first storing means; and storing the data stored in the second storing means in the external storing means when the updated program exists. The steps of determining and storing are performed when the operation of the micro controller is complete.

The data in the second storing means are not stored in the external storing means when the updated program does not exist.

As described above, a micro controller and a method of updating the same of the present invention store an algorithm program, not including a necessary program, in an extra storing device, and load and operate the algorithm program in RAM when the micro controller is driven. As a result, performance of the micro controller may be freely changed in accordance with an operation change and an upgrade of a system.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF SPECIFIC EMBODIMENTS

Hereinafter, the preferred embodiments of the present invention will be explained in detail with reference to the accompanying drawings.

Figure 1:
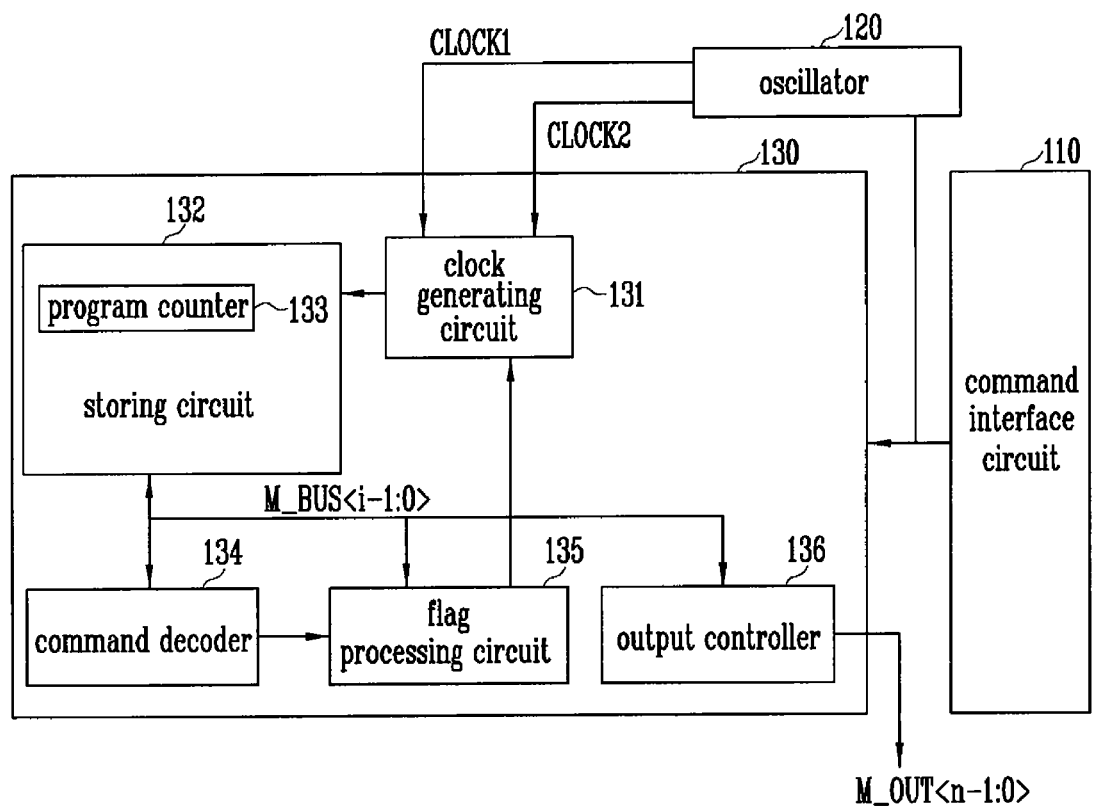
FIG. 1 is a block diagram illustrating a conventional micro controller.
Figure 2:
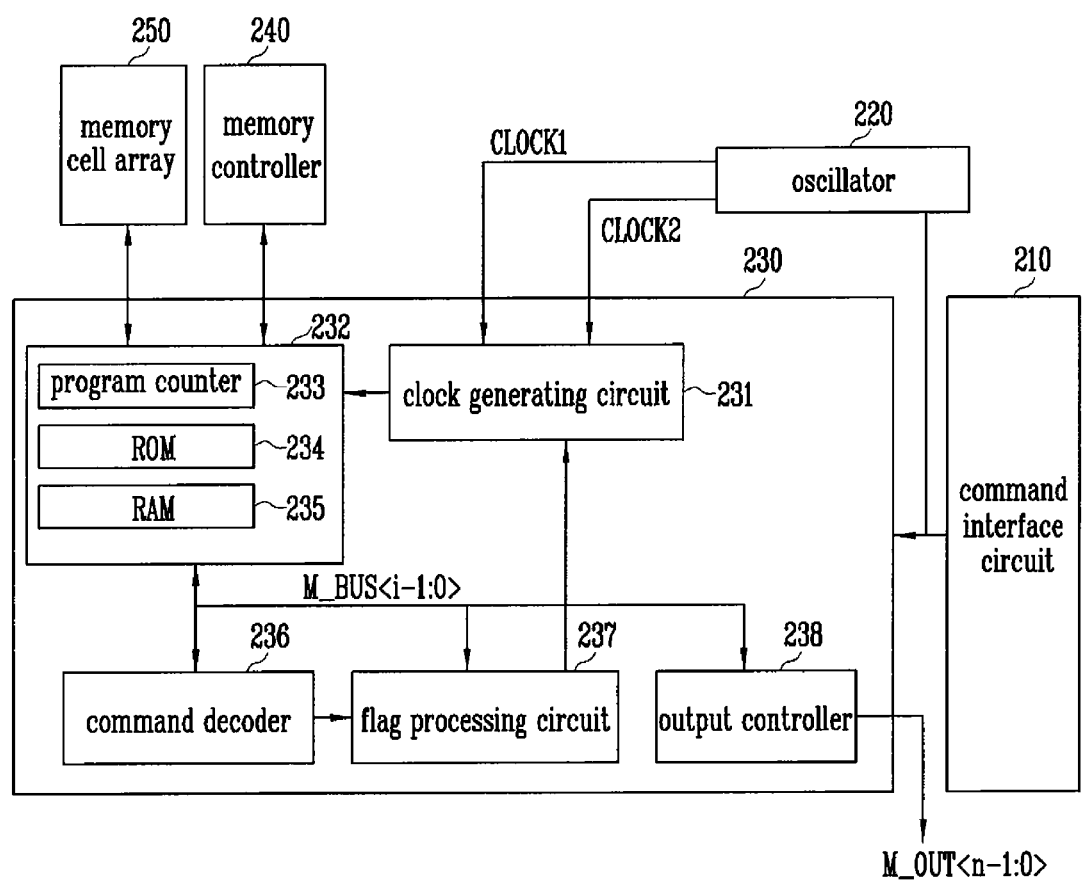
FIG. 2 is a block diagram illustrating a system having a micro controller according to one example embodiment of the present invention.

FIG. 2 is a block diagram illustrating a system having a micro controller according to one example embodiment of the present invention. Particularly, FIG. 2 shows the micro controller coupled to an NAND flash memory device according to one example embodiment of the present invention.

In FIG. 2, the micro controller 230 coupled to the NAND flash memory device is coupled to a command interface circuit 210 for receiving a command from an external device, an oscillator 220 for generating a clock, a memory cell array 250 and a memory controller 240.

The micro controller 230 includes a clock generating circuit 231, a storing circuit 232, a command decoder 236, a flag processing circuit 237 and an output controller 238.

The storing circuit 232 has a program counter 233, a ROM 234 and a random access memory (RAM).

The clock generating circuit 231 generates an operation clock in accordance with a reference clock provided from the oscillator 220 and flag information transmitted from the flag processing circuit 237, and transmits the generated operation clock to the storing circuit 232.

The program counter 233 operates in response to the operation clock generated by the clock generating circuit 231, and controls operation of an algorithm program in the ROM 234 or the RAM 235 in response to a counting signal of the program counter 233.

The ROM 234 stores the algorithm program for basic operation of the memory device. The basic operation has an initialization operation in an initial driving and a control operation of updating data in the RAM 235.

The RAM 235 stores the algorithm program but not including the basic operation algorithm program stored in the memory cell array 250 when the memory device is driven, and operates during the driving of the memory device. In addition, data stored in the RAM 235 are erased when an electric power source is turned off.

The command decoder 236 decodes a command outputted from the storing circuit 232 and outputs the decoded command.

The flag processing circuit 237 processes flag information transmitted from the storing circuit 232 or the command decoder 236 and provides the flag information to the clock generating circuit 231.

The output controller 238 outputs a command signal provided from the command decoder 236 or the storing circuit 232 to an external device.

The memory cell array 250 has a plurality of memory cells for storing data. The algorithm program to be transmitted to the RAM 235 when the memory device is driven is stored in an address field of the memory cell array 250. That is, when the memory device is driven, data in the address field are loaded, and the loaded data are temporarily stored in the RAM 235. The algorithm program operates while power is applied to the memory device.

The memory controller 240 performs operation control for storing data in the memory cell array 250 or for reading data from the memory cell array 250. Additionally, FIG. 2 omits a surrounding circuit having a page buffer (not shown) needed for operation of the memory cell array 250.

The memory device having the micro controller 230 drives the basic operation algorithm program stored in the ROM 234 when the electric power source is applied. In this case, the basic operation algorithm program controls the memory controller 240 so that the algorithm program data in the address field are loaded and the loaded data are stored in the RAM 235.

Operations of the memory device are controlled by the algorithm program data stored in the RAM 235 after the algorithm program data are stored in the RAM 235.

Accordingly, to amend or update the algorithm program for controlling operation of the memory device but not including the basic operation algorithm program stored in the ROM 234, an external device directly accesses the RAM 235 when power is applied to the memory device, and stores the algorithm program. The algorithm program is stored in the memory cell array 250 when power is turned off. In another example embodiment of the present invention, it is possible to update the algorithm program by changing the algorithm program data loaded in the RAM 235. The algorithm program data are changed by exchanging data in the address area set in the memory cell array 250.

Figure 3:
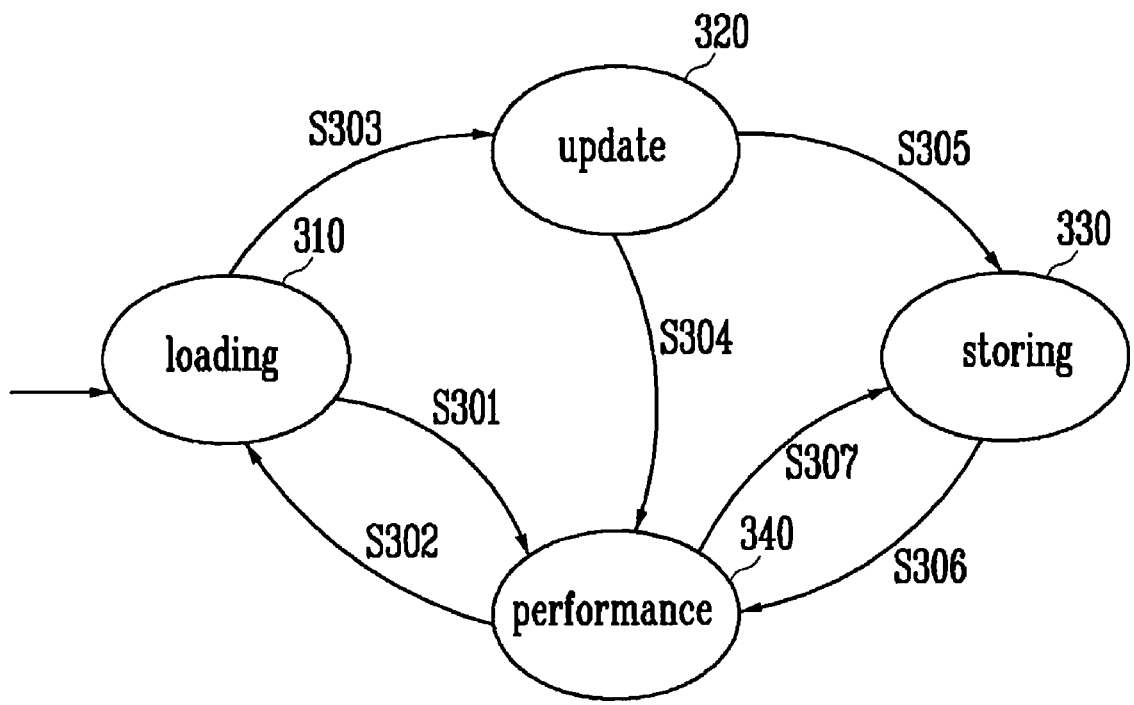
FIG. 3 is a view illustrating a method of updating the micro controller in FIG. 2.

FIG. 3 is a view illustrating a method of updating the micro controller in FIG. 2.

In FIG. 3, to update the algorithm program of the micro controller 230, the electric power source is turned on in the memory device, and the state of the micro processor 230 is converted into a loading state 310 in which the algorithm program data stored in the memory cell array 250 are loaded in accordance with control of the memory controller 240 by the ROM 234.

In the loading state 310, the algorithm program data stored in the address field set in response to control of the memory cell array 250 by the memory controller 240 are read, and the read data are stored in the RAM 235.

In step S301, the loading state 310 is converted into a performance state 340 using the algorithm program data stored in the RAM 235. In the performance state 340, operation of the micro controller 230 is executed using the algorithm program stored in the ROM 234 and the RAM 235. That is, control operation of the memory device is performed in the performance state 340.

In steps S301 and S302, the performance state 340 and the loading state 310 are repeatedly executed in response to a command transmitted from the command interface circuit 210. In other words, the algorithm program data stored in the memory cell array 250 is loaded simultaneously, and is then stored in the RAM 235. In another example embodiment of the present invention, only the necessary algorithm program data is loaded in response to the transmitted command, and then stored in the RAM 235.

In step S307, to update the algorithm program in the performance state 340, the performance state 340 may be converted into a storage state 330 in which the algorithm program is directly stored in the RAM 235 from an external device.

The loading state 310 is converted into an update state 320 as the ROM 234 drives the basic operation algorithm program in step S303, and then the update state 320 may be converted into the storage state 330 in which the transmitted algorithm program is stored as it is in the memory cell array 250 in step S305.

In addition, the update state 320 is converted into the performance state 340 by directly storing the update date in the RAM 235 rather than the memory cell array 250 in step S304, and the performance state 340 is converted into the storage state 330 when the electrical power source is turn off so that the algorithm program in the RAM 235 is stored in the memory cell array 250.

A program for controlling conversion operation between the states 310 to 340 is stored in the ROM 234.

The above updating method is summarized as described below.

First, when an update program inputted from the command interface circuit 210 exists while the memory device operates, the ROM 234 detects the update program and then controls the memory controller 240 so that the update program is stored in the memory cell array 250. Additionally, the update program stored in the memory cell array 250 is loaded, stored in the RAM 235, and executed.

Second, the update program inputted from the command interface circuit 210 is stored in the RAM 235 while the memory device operates. In addition, the memory device operates by executing the stored update program. Then, the update program in the RAM 235 is stored in the memory cell array 250 when the electrical power source is turned off.

Hereinafter, the updating method will be described in detail.

Figure 4:
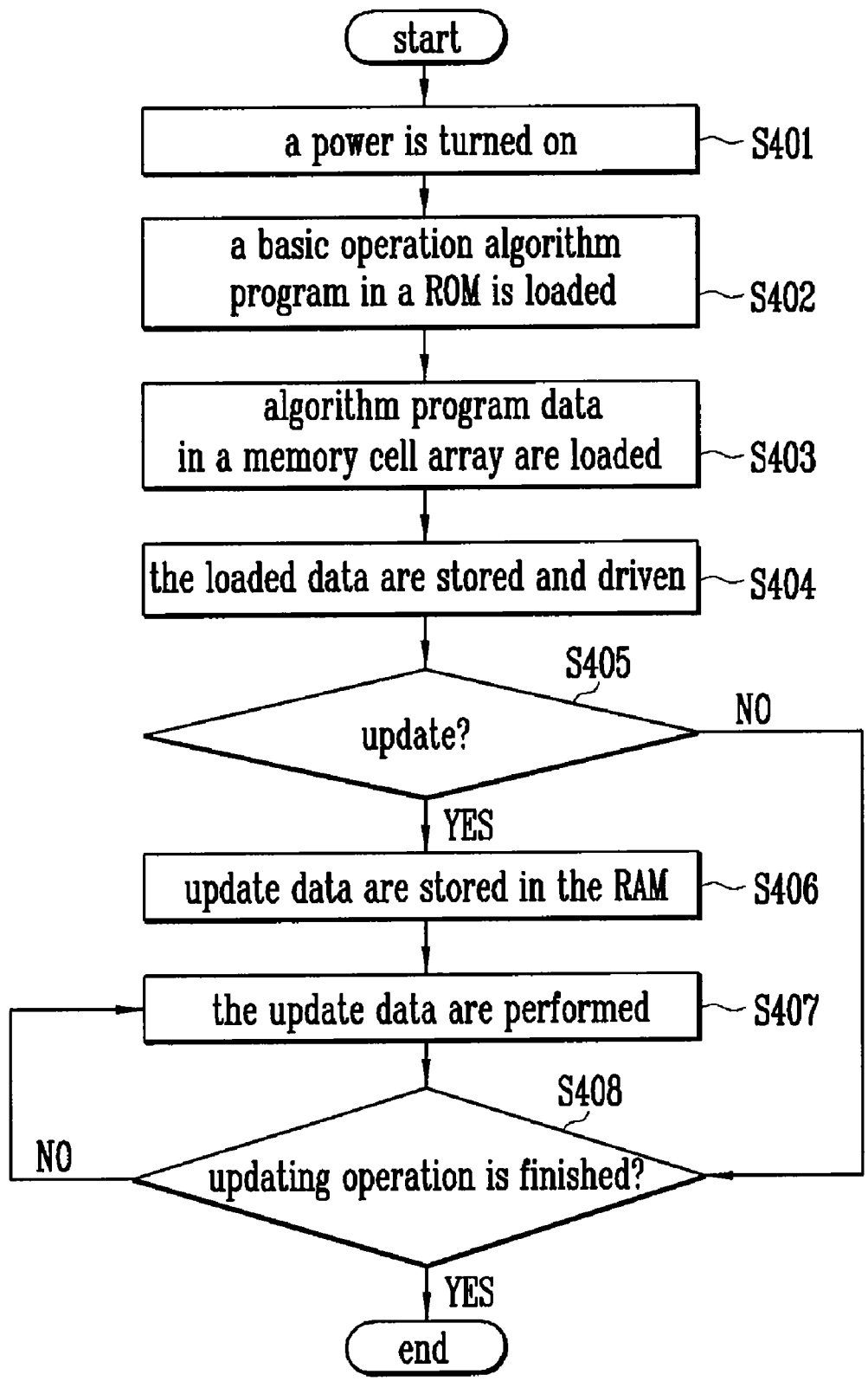
FIG. 4 is a flow chart illustrating an updating method in the micro controller according to one example embodiment of the present invention.

FIG. 4 is a flow chart illustrating an updating method in the micro controller according to one example embodiment of the present invention.

In FIG. 4, when a power is activated in step S401, operation of the micro controller 230 is started as the basic operation algorithm program of the ROM 234 is loaded in step S402.

In step S403, when the basic operation algorithm program stored in the ROM 234 is driven, the algorithm program data stored in the memory cell array 250 are loaded.

In step S404, the loaded data in step S403 are stored in the RAM 235. In addition, the algorithm program stored in the RAM 235 is selected and executed in response to the operation command inputted from the command interface circuit 210.

When a command related to an update of the algorithm program is inputted from the command interface circuit 210, the update data are stored in the RAM 235 in step S406.

In step S407, the data stored in the RAM 235 are updated while the memory device operates. Thus, the memory device may be operated in accordance with a new algorithm program related to the updated data.

When a power off command is inputted to the system in step S408, the ROM 234 stores every algorithm program stored in the RAM 235 in the memory cell array 250 and the updating operation is complete.

When the power off command is inputted, the ROM 234 verifies whether or not the updated algorithm program exists. The step of storing the algorithm program data in the memory cell array 250 may be omitted when the update algorithm program does not exist.

As described in FIG. 3, when the update command is inputted, the ROM 234 controls the memory controller 240 so that the update data are stored in the memory cell array 250, the stored data are loaded, and the loaded data are stored in the RAM 235.

In one example embodiment of the present invention, the micro controller 230 may store the algorithm program in a part of the memory cell array 250.

In another example embodiment of the present invention, the algorithm program may be stored in an extra storing device. The stored algorithm program is loaded when the system having the micro controller 230 operates, and then the algorithm program operates.

Accordingly, the storing device in which the algorithm program is stored may be changed. Additionally, when the capacity of the RAM is small, a process of loading only the necessary algorithm program in the RAM in accordance with a command and executing the algorithm program is repeatedly performed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of updating in a micro controller, the method comprising:
   beginning a power input;
   storing an operation algorithm in a second storing means in the micro controller in response to a power-on algorithm stored in a first storing means in the micro controller, the operation algorithm being read from an external storing means;
   performing operations related to the operation algorithm stored in the second storing means;
   updating the operation algorithm stored in the second storing means to a new operation algorithm in response to an update command;
   performing operations related to the new operation algorithm stored in the second storing means; and
   changing the operation algorithm stored in the external storing means to the new operation algorithm in response to a power-off command.

2. The method of claim 1, wherein the act of changing the operation algorithm stored in the external storing means to the new operation algorithm in response to a power-off command comprises:
   determining whether the new operation algorithm exists in the second storing means in response to the power-off command; and
   changing the operation algorithm stored in the external storing means to the new operation algorithm when the new operation algorithm exists.

3. The method of claim 2, wherein the changing is not performed when the new operation algorithm does not exist.

* * * * *